2,694,012

EDIBLE CONTAINER FOR FROZEN CONFECTIONS AND PROCESS FOR PREPARING THE SAME

Ernest L. Washburn, Mundelein, Ill., assignor to Illinois Development Laboratories, Inc., Chicago, Ill., a corporation of Illinois No Drawing. Application March 17, 1952, Serial No. 277,089

12 Claims. (Cl. 99—88)

This invention relates to an edible container for frozen confections and has for an object the provision of an edible container of the ice cream cone or cup type.

In the ice cream or frozen confection art it is desired to have an edible container for the confection which may be filled directly from the freezer and which will have tender and palatable qualities upon storage in contact with the frozen confection under the highly humid conditions prevalent in the usual cold storage freezer. Edible containers that have been proposed in the past were usually of the ice cream cone or cup type consisting essentially of a baked and toasted mixture in which a cereal flour is the major ingredient. However, conventional ice cream cones or cups have a tendency to become tough and leathery upon storage in a refrigerator as the cone or cup picks up moisture from the frozen confection or from the highly humid air in the cold storage chamber. This toughness appears to be due to certain physical-chemical changes that occur in the cone or cup. Thus the gluten of the cereal flour is believed to have a tendency to shrink and this change, along with other changes in the container product, results in a container which has tough and leathery properties upon storage under conditions of high humidity.

Accordingly, an object of this invention is the provision of an edible container of the cereal flour type for ice cream or other frozen confection which may be directly filled with the confection and the resulting article may be stored for long periods of time without the container having a tendency to become tough and leathery.

A still further object of this invention is the provision of an edible container for a frozen confection which improves on storage with respect to its qualities of tenderness and palatability.

A still further object of this invention is the provision of a flowable batter suitable for use on the usual type of ice cream cone-making machine which will, when baked and toasted in the usual manner, produce an edible container having the above indicated properties.

A still further object of this invention is the provision of a process of producing an edible container which will have the desired tender and palatable qualities upon extended storage under conditions of high humidity.

An additional object of this invention is the provision of a new article of manufacture comprising a frozen confection contained within an edible container which latter will maintain its properties of tenderness and palatability upon extended storage under conditions of high humidity.

Further and additional objects will appear from the following description and the appended claims.

In accordance with this invention, an edible container for a frozen confection is provided which comprises essentially a baked and toasted mixture of a cereal flour and a hydrophilic gelatinous material. Gelatinous materials that have been found to be particularly useful in accordance with this invention are those selected from the group consisting of gelatin, cellulose ethers and gums. Examples of suitable cellulose ethers are methyl cellulose, ethyl cellulose and carboxy methyl cellulose. Examples of gums that may be used in the composition are agar-agar gum tragacanth, gum acacia, gum arabic, and karaya gum. Other ingredients of the container may include shortening, emulsifying agents and a humectant, such as sorbitol or glycerol, together with other ingredients normally found in products of this general type, such as egg albumin, milk powder, flavoring, coloring and the like.

If desired, the humectant may be replaced partly or entirely by sugar. Any cereal flour, such as rice or corn flour, may be employed as the major constituent of the container but usually it is preferred to employ wheat flour.

The edible container of this invention may be readily prepared in the same manner and on substantially the same type of machines that are employed for the manufacture of conventional ice cream cones or cups. Thus the several ingredients of the container of this invention are formed into a viscous but readily flowable aqueous batter which is poured into molds and baked and toasted at an elevated temperature, suitably 325° to 350° F., for a period of one to two minutes. A substantially dry and toasted container results. This container may be and preferably is employed for receiving ice cream or other frozen confection directly from the freezer. If desired, a layer of chocolate or other coating may be employed as a topping and placed on top of the confection, and the resulting unit, comprising the container, the frozen confection and the topping, may be placed in cold storage. As pointed out above, the hydrophilic gelatinous ingredient in the container prevents the container from becoming tough and leathery on storage and, as a matter of fact, the tender and palatable properties of the container are improved upon storage due to the absorption of moisture by the container with the concomitant swelling of the added gelatinous hydrophilic material. As indicated above, the humectant, such as glycerol, sorbitol or high percentage of sugar, has a tendency to assist in the absorbability of the moisture during storage from the frozen confection itself or from the highly humid air surrounding it, thereby accelerating the change that enhances the tenderness of the container.

For a more complete understanding of this invention, reference is made to several specific examples. However, it will be understood that these examples are merely for purposes of illustration and the invention disclosed in this application is not to be limited with respect thereto.

Example 1

A batter was prepared having the following ingredients:

| | Parts by weight |
|---|---|
| Methyl cellulose | 15 |
| Gelatin | 50 |
| Egg albumin | 20 |
| Acetic acid | 5 |
| Hydrogenated vegetable shortening | 45 |
| Oat flour | 50 |
| Tween 60 | 2.2 |
| Span 40 | 2.2 |
| Soluble dried milk | 40 |
| Cocoa | 40 |
| Salt | 5 |
| Sorbitol (70% aqueous solution) | 5 |
| Chocolate color | 5 |
| Cone flour (wheat) | 910 |
| Water | 2400 |

The batter was prepared by dissolving the egg albumin in 400 parts of warm water. The methyl cellulose and gelatin were added to 800 parts of hot water and thereafter the remaining 1200 parts of cold water were added to the methyl cellulose-gelatin solution. The albumin dispersion was then added to the methyl cellulose-gelatin dispersion and thereafter the dried milk, Span 40, Tween 60, cocoa, oat flour, salt, sorbitol and coloring were added and thoroughly mixed. The wheat flour was then introduced slowly into the mixture and was thoroughly mixed until the lumps disappeared. Thereafter the acetic acid was added to give a hydrogen ion concentration corresponding to a value between pH 5.0 and 6.0. The shortening was then incorporated into the batter and blended. This batter was then used on a usual type of cone-making machine for forming baked and toasted cups or cones by heating in molds at 325° to 350° F. for about 1½ minutes.

These containers have much the same appearance, and initially have substantially the same properties as the usual type of ice cream cone or cup prepared without the hydrophilic gelatinous material. However, when the containers of this invention are filled directly with a frozen confection, such as ice cream, and then placed in cold storage, they will, upon reaching equilibrium with the moisture in the ice cream and in the cold storage chamber, become very tender and highly palatable. This is in contradistinction to containers which do not have the hydrophilic gelatinous material added since these latter have a tendency upon storage to develope stringy, tough and leathery properties which are undesired in a product of this type.

In this example a mixture of methyl cellulose and gelatin was used as the hydrophilic gelatinous substance. It will be noted that the combined percentage of these materials was about 5.4 per cent on a dry weight basis. It has been found that suitable containers may be prepared having the desired properties when the range of the hydrophilic gelatinous material is within the range of about 3 to about 15 per cent by weight. It is preferred, in accordance with this example, to employ both methyl cellulose and gelatin in order to provide an edible container having the desired taste characteristics. However, either gelatin or methyl cellulose alone may be used as the hydrophilic gelatinous material in the above formula. Likewise, as previously indicated, other hydrophilic gelatinous colloidal materials may be used to replace the methyl cellulose and/or gelatin wholly or in part. For example, ethyl cellulose, carboxy methyl cellulose, agar-agar, gum tragacanth, karaya gum, gum acacia, gum arabic and other materials of this general type may be employed for the purpose.

*Example 2*

A container having the desired characteristics was prepared from the same ingredients as indicated in Example 1 except that 45 parts by weight of agar-agar were substituted for the methyl cellulose and the gelatin, and 60 parts by weight of sucrose were substituted for the sorbitol. An ice cream cup was prepared from this batter in the usual way and the resulting container had desirable properties with respect to tenderness and palatability upon storage in contact with the frozen confection over a long period of time.

*Example 3*

Another batter was prepared having the same ingredients as indicated in Example 1 except that 65 parts by weight of gum tragacanth were substituted for the gelatin and methyl cellulose, 60 parts by weight of sucrose were substituted for the sorbitol, and 2500 parts by weight of water were employed. The toasted edible container prepared from this batter also had improved properties with respect to tenderness and palatability on storage under high humidity conditions.

The Span 40 and Tween 60 specified in the above examples are emulsifying agents derived from the fatty acid esters of anhydrous sorbitol. These compounds are commercially available from the Atlas Powder Company and are well known for use in the food industry. The oat flour is a desirable ingredient in the composition since it serves in part to emulsify the various materials, shortens the structure, and assists in permitting the release of the baked and toasted container from the mold of the baking and toasting machine. The acetic acid in the formula is employed to adjust the hydrogen ion concentration of the batter to a value corresponding to pH 5.0 to 6.0. This acidity adjustment serves to increase the tenderness of the product, to impart an improved surface finish to the container and to prevent it from sticking in the baking and toasting mold. Of course, other nonpoisonous acids may be employed for this purpose, such as lactic, tartaric, maleic, malic, fumaric, citric, phosphoric and hydrochloric acids, the amounts being dependent upon the strength of the acid and the amount required to bring the pH of the batter to between pH 5.0 and 6.0.

The container of this invention may take the form of cones or cups or may have any other suitable shape. For example, they may take the form of flat wafers, two of which could be used to enclose a frozen confection. The container of this invention is to be distinguished from baked products that are made from dough and which already contain a large amount of water after the baking operation. Thus the problem that has been solved by this present invention is not one which arises in the art of making bread or cookies. This invention is particularly useful for making containers for frozen confections but also may have applicability in other dried and toasted products formed from flowable batters where it is desired that the product be tender and palatable upon extended storage in the presence of moisture.

While particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. As a new article of manufacture, a substantially dry, baked and toasted edible container for frozen confections characterized by its ability to retain its tenderness and palatability upon storage under conditions of high humidity which comprises a molded, baked and toasted mixture of a cereal flour and a hydrophilic gelatinous substance, said substance constituting between about 3 and about 15 per cent by weight (dry basis) of said mixture.

2. As a new article of manufacture, a substantially dry, baked and toasted edible container for frozen confections characterized by its ability to retain its tenderness and palatability upon storage under conditions of high humidity which comprises a molded, baked and toasted mixture of wheat flour, shortening and a hydrophilic gelatinous substance selected from the group consisting of gelatin, cellulose ethers and gums, said substance constituting between about 3 and about 15 per cent by weight (dry basis) of said mixture.

3. A process of preparing a substantially dry and toasted edible container for a frozen confection, said container being characterized by its ability to retain its tenderness and palatability upon storage under conditions of high humidity, which comprises forming a flowable batter containing water, a cereal flour and a hydrophilic gelatinous substance, the amount on a dry weight basis of said substance in said batter being between about 3 and about 15 per cent, flowing said batter into a confining mold, and baking and toasting the batter in said mold to form said dry container.

4. A process of preparing a substantially dry and toasted edible container for a frozen confection, said container being characterized by its ability to retain its tenderness and palatability upon storage under conditions of high humidity, which comprises forming a flowable batter containing water, wheat flour, shortening and a hydrophilic substance selected from the group consisting of gelatin, cellulose ethers and gums, the amount on a dry weight basis of said substance in said batter being between about 3 and about 15 per cent, flowing said batter into confining molds of the ice-cream cone type, and baking and toasting the batter in said mold to form said dry container.

5. The process recited in claim 4 wherein the baking and toasting step is effected at about 325° to 350° F. for about 1 to 2 minutes.

6. The process recited in claim 4 wherein an emulsifying agent is incorporated into the batter and wherein the hydrogen ion concentration of the batter is adjusted to a value corresponding to a pH between about 5.0 and about 6.0 before flowing into said molds.

7. A process of preparing a substantially dry and toasted edible container for a frozen confection, said container being characterized by its ability to retain its tenderness and palatability upon storage under conditions of high humidity, which comprises forming a flowable batter containing water, wheat flour, shortening, a nongelatinous humectant, milk and egg solids, and a hydrophilic gelatinous substance selected from the group consisting of gelatin, cellulose ethers and gums, the amount on a dry weight basis of said substance in said batter being between about 3 and about 15 per cent, adjusting the hydrogen ion concentration of the batter to a value corresponding to a pH between about 5.0 and 6.0, flowing said batter into confining molds of the ice-cream cone type, and baking and toasting the batter in said mold to form said dry container.

8. The process recited in claim 7 wherein said substance is gelatin.

9. The process recited in claim 7 wherein said substance is gum.

10. The process recited in claim 7 wherein said substance is a cellulose ether.

11. The process recited in claim 7 wherein said substance is methyl cellulose.

12. The process recited in claim 7 wherein said substance is agar-agar.

References Cited in the file of this patent

UNITED STATES PATENTS

| Number | Name | Date |
|---|---|---|
| 1,657,116 | Fiske | Jan. 24, 1928 |
| 1,808,108 | Hawks | June 2, 1931 |
| 1,964,940 | Epstein | July 3, 1934 |
| 2,155,106 | Turnbull | Apr. 18, 1939 |
| 2,395,060 | Musher | Feb. 19, 1946 |

OTHER REFERENCES

"A Comparison of Some Ice Cream Stabilizers," by Josephson et al., Southern Dairy Products Journal, vol. 13, page 103.

"Atlas Sorbitol," Atlas Powder Co., Wilmington, Del., 1947, pages 9 and 11.